US011897207B2

(12) United States Patent
Chae et al.

(10) Patent No.: US 11,897,207 B2
(45) Date of Patent: Feb. 13, 2024

(54) SEALING DEVICE FOR SECONDARY BATTERY

(71) Applicant: LG Chem, Ltd., Seoul (KR)

(72) Inventors: Ik Soo Chae, Daejeon (KR); Chang Bum Ahn, Daejeon (KR)

(73) Assignee: LG Energy Solution, Ltd. (KR)

( * ) Notice: Subject to any disclaimer, the term of this patent is extended or adjusted under 35 U.S.C. 154(b) by 787 days.

(21) Appl. No.: 16/971,522

(22) PCT Filed: Jan. 21, 2019

(86) PCT No.: PCT/KR2019/000857
§ 371 (c)(1),
(2) Date: Aug. 20, 2020

(87) PCT Pub. No.: WO2019/177257
PCT Pub. Date: Sep. 19, 2019

(65) Prior Publication Data
US 2020/0388800 A1 Dec. 10, 2020

(30) Foreign Application Priority Data
Mar. 12, 2018 (KR) .................. 10-2018-0028578

(51) Int. Cl.
*B29C 65/18* (2006.01)
*H01M 10/04* (2006.01)
(Continued)

(52) U.S. Cl.
CPC ............. *B29C 65/18* (2013.01); *H01M 10/04* (2013.01); *H01M 50/186* (2021.01); *B29L 2031/3468* (2013.01)

(58) Field of Classification Search
CPC . B29C 65/18; B29L 2031/3468; H01M 10/04
(Continued)

(56) References Cited

U.S. PATENT DOCUMENTS

2016/0049682 A1    2/2016   Won et al.
2022/0123354 A1*   4/2022   Lee ..................... H01M 10/058

FOREIGN PATENT DOCUMENTS

JP    H10100459 A      4/1998
JP    2002151835 A     5/2002
(Continued)

OTHER PUBLICATIONS

International Search Report for Application No. PCT/KR2019/000857 dated Apr. 16, 2019, 2 pages.
(Continued)

*Primary Examiner* — James D Sells
(74) *Attorney, Agent, or Firm* — Lerner David LLP

(57) ABSTRACT

The present invention relates to a sealing device for a secondary battery. The sealing device is configured to seal a battery case accommodating an electrode assembly therein to manufacture the secondary battery, the sealing device including a sealing block configured to press a sealing portion of the battery case, a flatness adjusting part configured to adjust a flatness of a pressing surface of the sealing block, and a heater part configured to transfer heat to the sealing block to thermally fuse the sealing portion of the battery case when the sealing portion is pressed by the sealing block.

17 Claims, 7 Drawing Sheets

(51) Int. Cl.
*H01M 50/186* (2021.01)
*B29L 31/34* (2006.01)

(58) Field of Classification Search
USPC ....................................................... 156/308.4
See application file for complete search history.

(56) References Cited

FOREIGN PATENT DOCUMENTS

| | | |
|---|---|---|
| JP | 4381020 B2 | 12/2009 |
| JP | 5513928 B2 | 6/2014 |
| KR | 100182176 B1 | 4/1999 |
| KR | 200461526 Y1 | 7/2012 |
| KR | 20120102935 A | 9/2012 |
| KR | 20140015647 A | 2/2014 |
| KR | 20150025687 A | 3/2015 |
| KR | 20150063658 A | 6/2015 |
| KR | 20150137742 A | 12/2015 |
| KR | 20160024122 A | 3/2016 |
| KR | 101762807 B1 | 7/2017 |

OTHER PUBLICATIONS

Extended European Search Report including Written Opinion for Application No. 19767785.9 dated Mar. 15, 2021, 7 pages.

* cited by examiner

SEALING DEVICE FOR SECONDARY BATTERY

CROSS-REFERENCE TO RELATED APPLICATION

The present application is a national phase entry under 35 U.S.C. § 371 of International Application No. PCT/KR2019/000857, filed on Jan. 21, 2019, which claims priority to Korean Patent Application No. 10-2018-0028578, filed on Mar. 12, 2018, the disclosures of which are hereby incorporated herein by reference in their entireties.

TECHNICAL FIELD

The present invention relates to a sealing device for a secondary battery.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

The secondary battery is mass-produced by sealing an outer circumferential surface of the battery case after accommodating the electrode assembly in the batter case. Here, when a sealing tool for sealing the battery case is not flat, a thickness deviation of a sealing portion may occur.

In addition, a heater structure for heating the sealing tool according to the related art has difficulty in securing temperature uniformity, and thus, the thickness deviation of the sealing portion may be intensified.

DISCLOSURE OF THE INVENTION

Technical Problem

One aspect of the present invention is to provide a sealing device for a secondary battery, which is capable of adjusting flatness of a sealing block for sealing a battery case of the secondary battery.

Another aspect of the present invention is to provide a sealing device for a secondary battery, in which a heater part is provided to secure temperature uniformity of a sealing block.

Technical Solution

A sealing device for a secondary battery, the sealing device configured to seal a battery case accommodating an electrode assembly therein to manufacture the secondary battery, according to an embodiment of the present invention comprises a sealing block configured to press a sealing portion of the battery case, a flatness adjusting part configured to adjust a flatness of a pressing surface of the sealing block, and a heater part configured to transfer heat to the sealing block to thermally fuse the sealing portion of the battery case when the sealing portion is pressed by the sealing block.

Advantageous Effects

According to the present invention, the flatness adjusting part for adjusting the flatness of the sealing block sealing the battery case of the secondary battery may be provided to prevent the thickness deviation of the sealing portion from occurring.

In addition, according to the present invention, the heater part having the structure in which the temperature uniformity of the sealing block is secured may be provided to effectively prevent the thickness deviation of the sealing portion from occurring.

MODE FOR CARRYING OUT THE INVENTION

Figure 1:
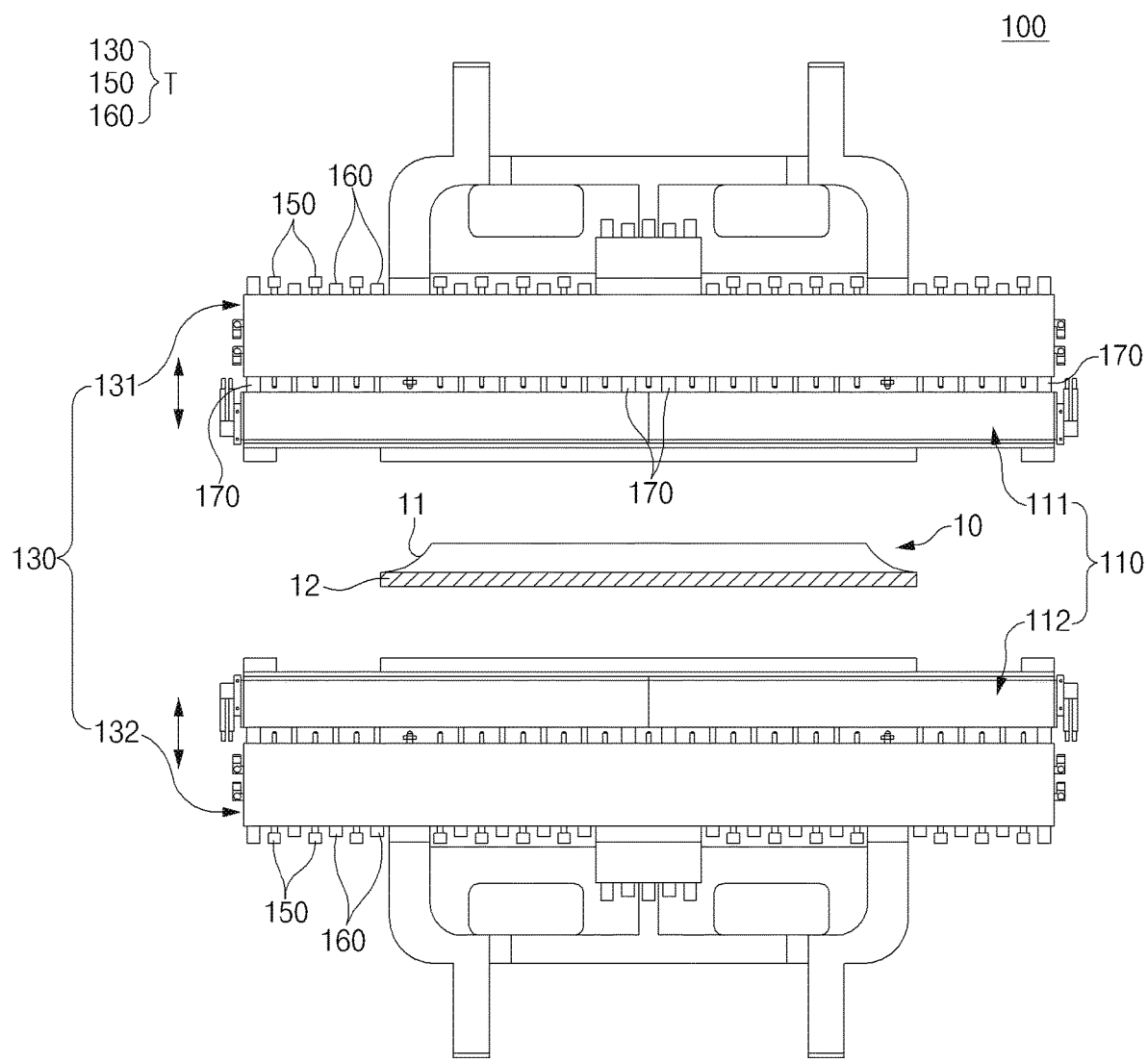
FIG. 1 is a front view illustrating an example of a sealing device for a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
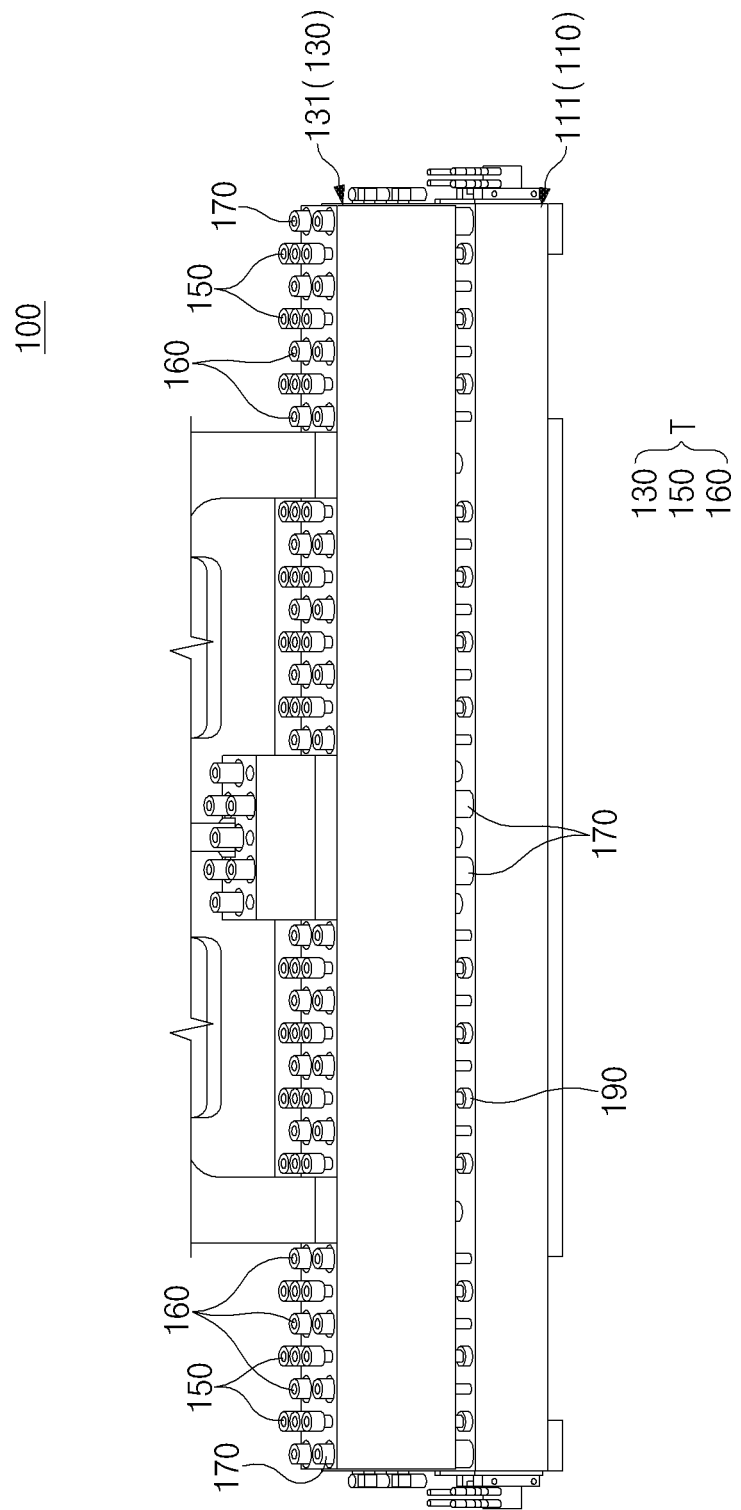
FIG. 2 is a perspective view illustrating an example of the sealing device for the secondary battery according to an embodiment of the present invention.
Figure 3:
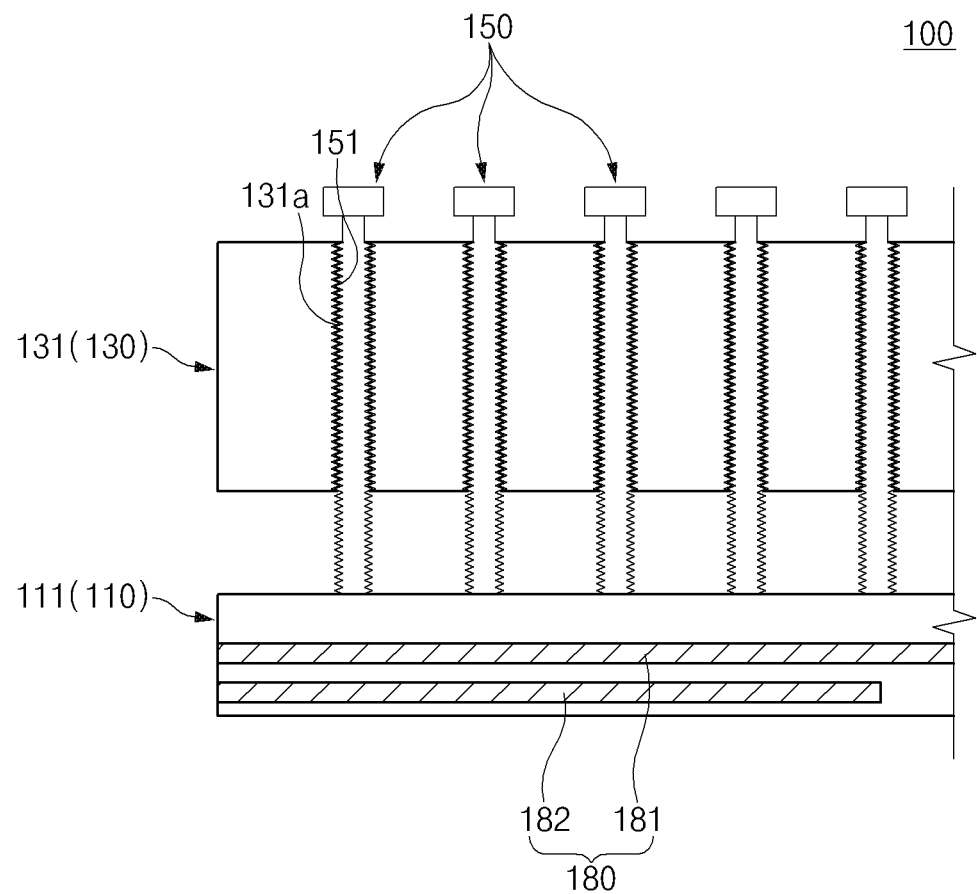
FIG. 3 is a cross-sectional view illustrating a coupled state of an adjusting screw in the sealing device for the secondary battery according to an embodiment of the present invention.

FIG. 1 is a front view illustrating an example of a sealing device for a secondary battery according to an embodiment of the present invention, FIG. 2 is a perspective view illustrating an example of the sealing device for the secondary battery according to an embodiment of the present invention, and FIG. 3 is a cross-sectional view illustrating a coupled state of an adjusting screw in the sealing device for the secondary battery according to an embodiment of the present invention.

Referring to FIGS. 1 to 3, a sealing device 100 for a secondary battery according to an embodiment of the present invention is a sealing device 100 that seals a battery case 11 accommodating an electrode assembly (not shown) therein to manufacture a secondary battery 10 and comprises a sealing block 110 pressing a sealing portion 12, a flatness adjusting part T adjusting flatness of the sealing block 110, and a heater part 180 transferring heat to the sealing portion 12. Here, the electrode assembly may be a chargeable and dischargeable power generation element and have a structure in which an electrode (not shown) and a separator (not shown) are combined and alternately stacked.

Hereinafter, the sealing device for the secondary battery according to an embodiment of the present invention will be described in more detail with reference to FIGS. 1 to 5.

Referring to FIGS. 1 and 2, the sealing block 110 may press the sealing portion 12 of the battery case 11 to seal the sealing portion 12.

Figure 4:
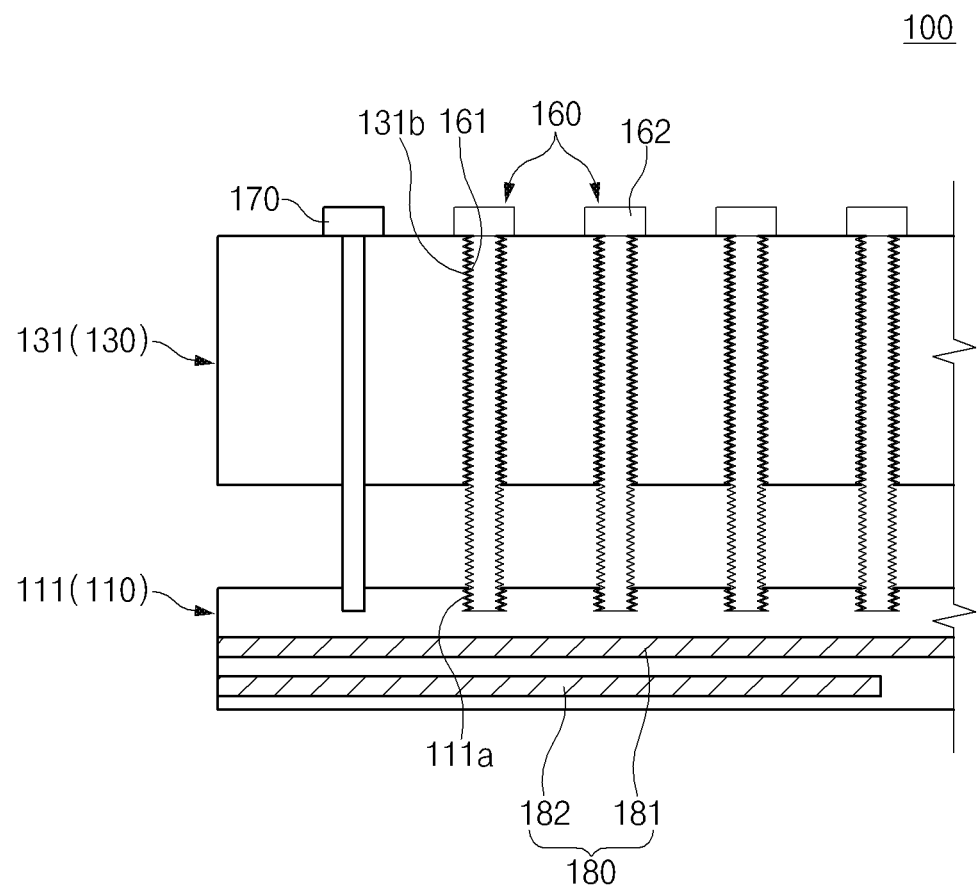
FIG. 4 is a cross-sectional view illustrating a coupled state of a support screw in the sealing device for the secondary battery according to an embodiment of the present invention.

Also, the sealing block 110 has a screw groove 111a that is opened in a direction of the support block 130 (see FIG. 4).

Also, the sealing block 110 may comprise a first sealing block 111 and a second sealing block 112.

Furthermore, the first sealing block 111 and the second sealing block 112 move in directions facing each other to press both side surfaces of the sealing portion 12 of the battery case 11.

Referring to FIGS. 2 and 3, the flatness adjusting part T may adjust flatness with respect to a pressing surface of the sealing block 110.

Also, the flatness adjusting part T may comprises an adjusting screw 150 that is provided in plurality and moves forward and backward in direction that is close to and away from the sealing block 110 so that an end of the adjusting screw 150 presses the sealing block to adjust the flatness of the sealing block 110. Here, the adjusting screw comprises a screw part 151 on which a screw thread is formed along an outer circumferential surface thereof.

The flatness adjusting part T may further comprise a support block 130 to which the adjusting screw 150 is coupled. Here, the adjusting screw 150 may be supported by the support block 130. Here, the support block 130 comprises a first support block 131 and a second support block 132.

Also, the support block 130 may have a plurality of screw holes 131a and through-holes 131b, which pass in a direction of the sealing block. Here, the screw part may be formed on an inner circumferential surface of each of the screw holes 131a and the through-holes 131b (see FIG. 4).

Also, while the plurality of adjusting screws 150 are respectively screw-coupled to the plurality of screw holes 131a of the support block 130 to move forward and backward, a portion or whole of the adjusting screws 150 may selectively press the sealing block 110 to adjust the flatness of the sealing block 110.

The plurality of adjusting screws 150 may be coupled to the support block 130 in a plurality of rows and columns. Thus, ends of the adjusting screws 150, which are coupled to the support block 130 in the plurality of rows and columns, may press a plurality of portions of the sealing block 110 to more precisely adjust the flatness of the sealing block 110. Here, the plurality of adjusting screws 150 may adjust, for example, the flatness on the pressing surface of the sealing block 110 in four directions on a plan view. That is, the flatness toward left, right, front, and rear sides of the sealing block 110 on the plan view may be adjusted through the plurality of adjusting screws 150 provided in the plurality of rows and columns.

Here, in more detail, for example, if it is determined that the sealing block 110 is in a state in which the left side is lower than the right side in the plan view, the adjusting screw 150 of the plurality of adjusting screws 150, which is disposed in a right vertical line may rotate to press the right side of the sealing block 110 so that left and right heights match each other. Also, in more detail, for example, if it is determined that the sealing block 110 is in a state in which the front side is lower than the rear side in the plan view, the adjusting screw 150 of the plurality of adjusting screws 150, which is disposed in a rear vertical line may rotate to press the rear side of the sealing block 110 so that front and rear heights match each other. Furthermore, in detail, for example, if it is determined that the sealing block 110 is in a state in which a left rear-side edge is lower than a right front-side edge in the plan view, the adjusting screw 150 of the plurality of adjusting screws 150, which is disposed in a vertical line of the right front-side edge may rotate to press the right front-side edge of the sealing block 110 so that heights of left rear-side edges and the right front-side edge match each other.

FIG. 4 is a cross-sectional view illustrating a coupled state of the support screw in the sealing device for the secondary battery according to an embodiment of the present invention.

Referring to FIGS. 2 and 4, the flatness adjusting part T may further comprise a plurality of support screws 160 which are screw-coupled to the support block 130 to pass through the support block 130 and of which ends are screw-coupled to the sealing block 110 to support the sealing block 110.

Each of the support screws 160 may comprise a support screw part 161 on which a screw thread is formed along an outer circumferential surface thereof. Here, the support screw part 161 may be formed over a remaining portion except for a head portion 162 of the support screw 160.

The through-hole 131b may be formed in the support block 130 to correspond to the support screw part 161 of the support screw 160 so that the support screw 160 is screw-coupled to the support block 130. Also, an end of the support screw 160 may be screw-coupled to the screw groove 111a of the sealing block 110.

Figure 5:
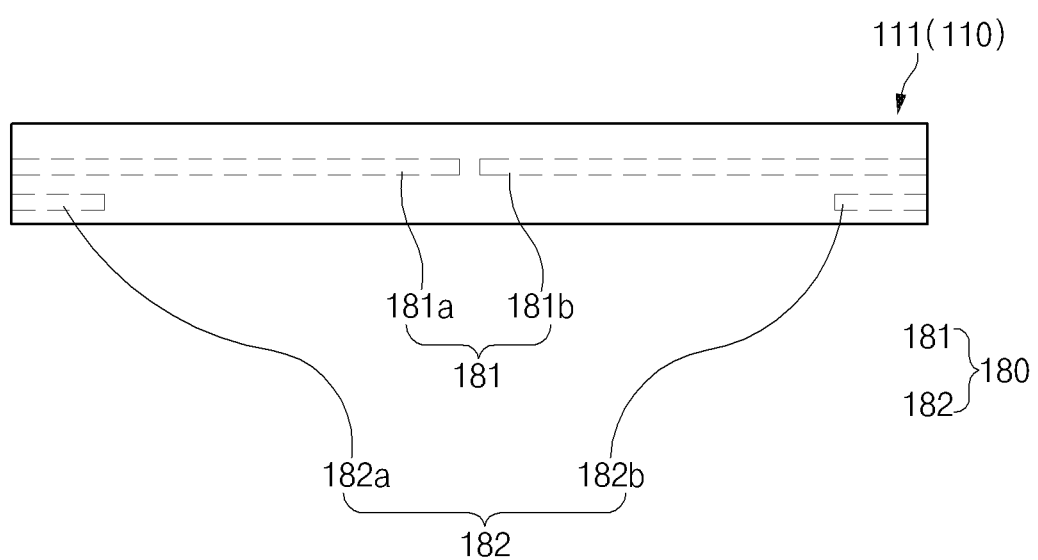
FIG. 5 is a projection view illustrating an example of a heater part provided in a sealing block in the sealing device for the secondary battery according to an embodiment of the present invention.

FIG. 5 is a projection view illustrating an example of a heater part provided in the sealing block in the sealing device for the secondary battery according to an embodiment of the present invention.

Referring to FIG. 5, a heater part 180 may transfer heat to thermally fuse the sealing portion 12 that is pressed by the sealing block 110.

Also, the heater part 180 may be provided in plurality, and the plurality of heater parts 180 may be disposed on both sides of the inside of the sealing block 110.

Furthermore, the heater part 180 may comprise a plurality of main heaters 181 disposed in the same line and a plurality of auxiliary heaters 182 disposed to be spaced a predetermined distance from the plurality of main heaters 181.

Here, the plurality of main heaters 181 may comprise a first main heater 181a disposed over a central portion of one side of the sealing block 110 and a second main heater 181b disposed over a central portion of the other side of the sealing block 110.

Also, the plurality of auxiliary heaters 182 may comprise a first auxiliary heater 182a disposed at one side of the sealing block 110 and a second auxiliary heater 182b disposed at the other side of the sealing block 110.

Thus, the heater part 180 may have a structure that is capable of securing temperature uniformity of the sealing block 110 to effectively prevent a thickness deviation of the sealing portion 12 from occurring.

That is, the first auxiliary heater 182a and the second auxiliary heater 182b may be provided on both sides of the sealing block 110, which have a relatively larger heat loss than that of the central portion of the sealing block 110 to prevent a temperature deviation of the sealing block from occurring or significantly reduce the occurrence of the temperature deviation, and also, the sealing portion 12 of the battery case may be sealed by using the sealing block 110 of which the central portion and both the sides have a uniform temperature to prevent the thickness deviation of the sealing portion 12 from occurring or significantly reduce the occurrence of the thickness deviation (see FIG. 1).

Figure 6:
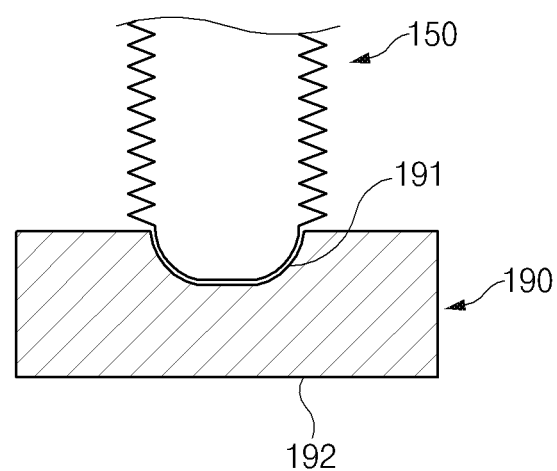
FIG. 6 is a cross-sectional view illustrating an example of a flatness adjusting member in the sealing device for the secondary battery according to an embodiment of the present invention.

FIG. 6 is a cross-sectional view illustrating an example of the flatness adjusting member in the sealing device for the secondary battery according to an embodiment of the present invention.

Referring to FIG. 3, in the sealing device 100 according to an embodiment of the present invention, for example, the end of the adjusting screw 150 may directly press the sealing block 110.

Also, referring to FIGS. 2 and 6, in the sealing device 100 according to an embodiment of the present invention, for another example, the flatness adjusting member 190 may be further provided on the end of the adjusting screw to press the sealing block 110 through the flatness adjusting member 190. Here, the flatness adjusting member 190 has one side in which an insertion groove 191, in which an end of the adjusting screw 150 is inserted, is formed and the other side on which a planar part 192, which surface-contacts a surface to be pressed of the sealing block 110, is formed. Here, when the sealing block 110 is pressed to adjust the flatness, the flatness adjusting member 190 may have a width greater than a diameter of the adjusting screw 150. Thus, the sealing block 110 may be pressed through the flatness adjusting member 90 provided with the planar part having the area greater than the width of the adjusting screw 150 to more easily adjust the flatness when compared to that in which the sealing block 110 is directly pressed through the end of the adjusting screw 150 having a rounded end with a narrow width, a sharp protruding shape, or an irregular shape.

Also, the flatness adjusting member 190 may be made of, for example, a stainless steel material.

Referring to FIGS. 1 and 4, the sealing device 100 for the secondary battery according to an embodiment of the present invention may further comprise a guide bar 170 coupled over the support block 130 and the sealing block 110.

When the flatness of the sealing block 110 is adjusted through the adjusting screw 150, the guide bar 170 may guide the movement of the sealing block, which moves forward and backward, through the adjusting screw 150.

Also, the guide bar 170 may be, for example, provided in plurality, and the plurality of guide bars 170 may be respectively disposed on both sides and central portions of the support block 130 and the sealing block 110.

Figure 7:
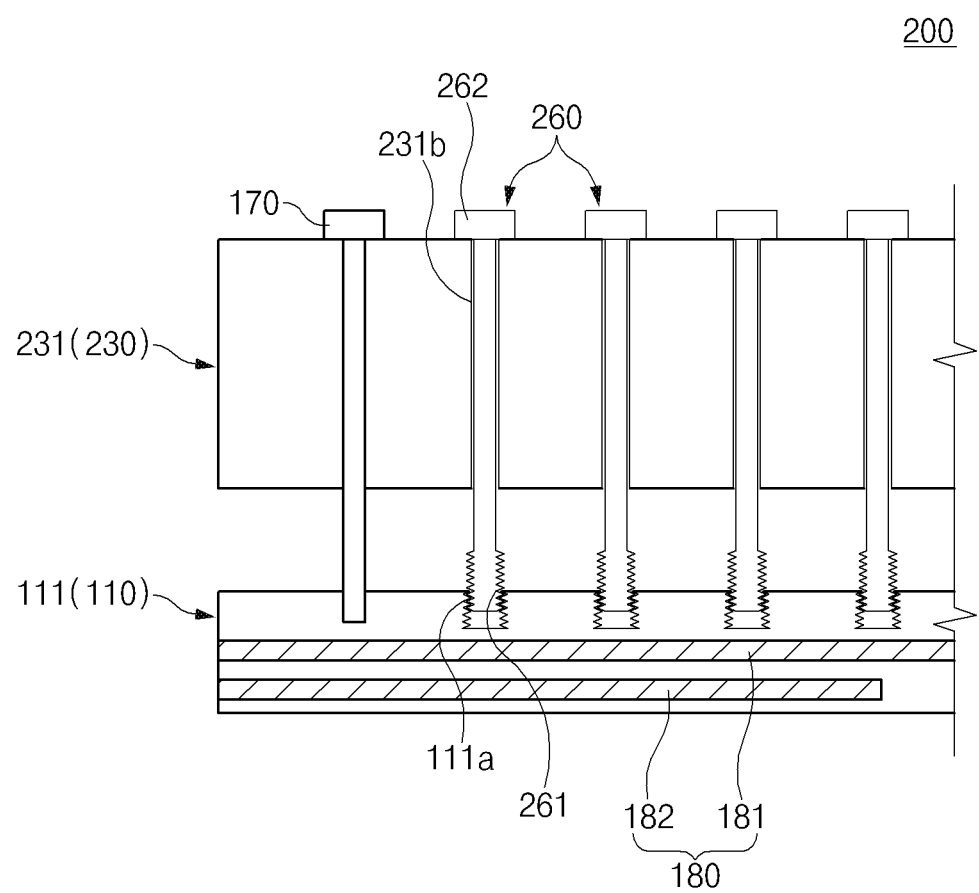
FIG. 7 is a cross-sectional view illustrating an example of a coupled state of a support screw in a sealing device for a secondary battery according to another embodiment of the present invention.

FIG. 7 is a cross-sectional view illustrating an example of a coupled state of a support screw in a sealing device for a secondary battery according to another embodiment of the present invention.

Referring to FIG. 7, a sealing device 200 for a secondary battery according to another embodiment of the present invention comprises a sealing block 110 pressing a sealing portion 12, a flatness adjusting part adjusting flatness of the sealing block 110, and a heater part 180 transferring heat to the sealing portion 12. Here, the flatness adjusting part may comprise a plurality of adjusting screws adjusting the flatness of the sealing block 110, a support block 230 coupled to the adjusting screws, and a plurality of support screws 260 supporting the sealing block 110.

The sealing device 200 for the secondary battery according to another embodiment of the present invention is different from the sealing device 100 for the secondary battery according to the forgoing embodiment in that the support screws 260 is coupled to the support block 230. Thus, in this embodiment, contents duplicated with the foregoing embodiment will be briefly described.

In the sealing device 200 for the secondary battery according to another embodiment of the present invention, the plurality of support screws 260 may pass through the support block 230 and then be coupled to the sealing block 110.

Also, ends of the support screws 260 may be screw-coupled to the sealing block 110 to support and fix the sealing block 110.

Furthermore, a portion of each of the support screws 260, which passes through the support block, may have a cylindrical shape, and a support screw part 261 on which a screw thread is formed on an outer circumferential surface thereof may be formed on the end of the support screw 260, which is coupled to the sealing block 110. That is, the support screw 160 may have a cylindrical shape in which the screw thread is not formed on the central portion thereof, which is inserted into a through-hole 231b of the support block 230, and the support screw part 261 having the screw thread may be provided on the end of the sealing block 110, which is coupled to a screw groove 111a.

Also, a through-hole 231b having a cylindrical shape may be formed in the support block 230 so that the support screw 260 is inserted into the support block 230 to pass through the support block 230.

A head portion 262 of the support screw 260 may have a width greater than that of the through-hole 231b of the support block 230 to prevent the support screw 260 from being released and separated from the support block 230.

Thus, the support screw 260 may easily move within the through-hole 231b of the support block 230 to easily adjust the flatness of the sealing block 110 through the adjusting screw 150.

In the case of the foregoing embodiment, it may be advantageous to adjust the flatness at the more local portion, and in the case of another embodiment, is may be advantageous to adjust the flatness on the more wide area.

While the present invention has been particularly shown and described with reference to exemplary embodiments thereof, it is to be understood that the scope of the present invention is not limited to the sealing device for the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A sealing device for a secondary battery, the sealing device configured to seal a battery case accommodating an electrode assembly therein to manufacture the secondary battery, the sealing device comprising:
   a sealing block configured to press a sealing portion of the battery case;
   a flatness adjusting part configured to adjust a flatness of a pressing surface of the sealing block, the flatness being closeness of a portion of the pressing surface to a plane defined by a remainder of the pressing surface; and
   a heater part configured to transfer heat to the sealing block to thermally fuse the sealing portion of the battery case when the sealing portion is pressed by the sealing block.

2. The sealing device of claim 1, wherein the flatness adjusting part comprises a plurality of adjusting screws that are configured to move in opposite vertical directions perpendicular to a horizontal plane substantially coincident with the pressing surface of the sealing block so that an end of each of the plurality of adjusting screws is configured to press the sealing block to adjust the flatness of the pressing surface of the sealing block.

3. The sealing device of claim 2, wherein the flatness adjusting part further comprises a support block to which each of the plurality of adjusting screws are coupled, and each of the plurality of adjusting screws is supported by the support block.

4. The sealing device of claim 3, wherein the plurality of adjusting screws are coupled to the support block in a grid arrangement having plurality of rows and columns.

5. The sealing device of claim 3, wherein, each of the plurality of adjusting screws is threadedly coupled to the support block, such that the sealing device is configured to move some or all of the adjusting screws in the vertical directions to selectively press respective locations on the sealing block to adjust the flatness of the pressing surface of the sealing block.

6. The sealing device of claim 5, wherein the flatness adjusting part further comprises a plurality of support screws that are threadedly coupled to the support block, the plurality of support screws passing through the support block in the vertical directions, ends of the plurality of support screws being threadedly coupled to the sealing block to support the sealing block.

7. The sealing device of claim 5, wherein the flatness adjusting part further comprises a plurality of support screws that pass through the support block in the vertical directions so as to be coupled to the support block, and ends of the plurality of support screws are threadedly coupled to the sealing block to support the sealing block.

8. The sealing device of claim 6, wherein the flatness adjusting part further comprises a plurality of flatness adjusting members, each of the plurality of flatness adjusting members being provided on the end of each of the plurality of adjusting screws, respectively, and
   wherein each of the plurality of flatness adjusting members has an insertion groove formed in a first side thereof into which the end of a respective one of the plurality of adjusting screws is inserted, and a planar part formed in a second side thereof that is configured to surface-contact a surface of the sealing block to be pressed.

9. The sealing device of claim 1, wherein the heater part is a plurality of heater parts, and the plurality of heater parts are disposed on first and second opposite sides of an inside of the sealing block.

10. The sealing device of claim 1, wherein the heater part comprises a plurality of main heaters disposed in a first common plane and a plurality of auxiliary heaters disposed in a second common plane that is spaced apart from the first common plane by a predetermined distance,
    wherein the plurality of main heaters comprises a first main heater disposed over a central portion of a first lateral side of the sealing block and a second main heater disposed over a central portion of a second lateral side of the sealing block, and
    the plurality of auxiliary heaters comprises a first auxiliary heater disposed at the first lateral side of the sealing block and a second auxiliary heater disposed at the second lateral side of the sealing block.

11. A sealing assembly comprising first and second sealing devices, each of the first and second sealing devices being the sealing device of claim 1, wherein the sealing block of the first sealing device and the second sealing block of the second sealing device are configured to move in the opposite vertical directions, respectively, the sealing block of the first sealing device and the sealing block of the second sealing device facing each other and configured to press opposite respective side surfaces of the sealing portion of the battery case.

12. The sealing device of claim 7, wherein the flatness adjusting part further comprises a plurality of flatness adjusting members, each of the plurality of flatness adjusting members being provided on the end of each of the plurality of adjusting screws, respectively, and
    wherein each of the plurality of flatness adjusting members has an insertion groove formed in a first side thereof into which the end of a respective one of the plurality of adjusting screws is inserted, and a planar part formed in a second side thereof that is configured to surface-contact a surface of the sealing block to be pressed.

13. A method of sealing a battery case of a secondary battery, the battery case accommodating an electrode assembly therein, the method comprising:
    pressing a sealing block against a sealing portion of the battery case;
    adjusting a flatness of a pressing surface of the sealing block by moving a flatness adjusting part, the flatness being closeness of a portion of the pressing surface to a plane defined by a remainder of the pressing surface; and
    transferring heat from a heater part to the sealing block to thermally fuse the sealing portion that is pressed by the sealing block.

14. The method of claim 13, further comprising moving a plurality of adjusting screws in opposite vertical directions perpendicular to a horizontal plane substantially coincident with the pressing surface of the sealing block so that an end of each of the plurality of adjusting screws presses the sealing block to adjust the flatness of the pressing surface of the sealing block.

15. The method of claim 14, further comprising selectively pressing some or all of the plurality of adjusting screws to respective locations on the sealing block to adjust the flatness of the pressing surface of the sealing block.

16. The method of claim 15, wherein the pressing of the some or all of the plurality of adjusting screws to the respective locations on the sealing block is performed by pressing a plurality of flatness adjusting members onto a surface of the sealing block that is pressed, each of the plurality of flatness adjusting members being coupled to a respective one of the plurality of adjusting screws and being disposed between the respective one of the plurality of adjusting screws and the respective location on the sealing block.

17. The method of claim 13, wherein the sealing block comprises a first sealing block and a second sealing block, the method further comprising moving the first sealing block and the second sealing block towards one another in opposite vertical directions and pressing opposite respective side surfaces of the sealing portion of the battery case.

\* \* \* \* \*